(12) United States Patent
Dacosta

(10) Patent No.: US 7,263,386 B2
(45) Date of Patent: Aug. 28, 2007

(54) HIGH GAIN OMNIDIRECTIONAL ANTENNA AND RELATED METHOD

(75) Inventor: Behram M. Dacosta, San Diego, CA (US)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 640 days.

(21) Appl. No.: 10/396,909

(22) Filed: Mar. 25, 2003

(65) Prior Publication Data

US 2004/0192203 A1     Sep. 30, 2004

(51) Int. Cl.
*H04M 1/00*     (2006.01)
*H04Q 7/20*     (2006.01)
*H04B 7/14*     (2006.01)

(52) U.S. Cl. .................... 455/562.1; 455/524; 455/25

(58) Field of Classification Search ............... 455/25, 455/63.4, 562.1, 575.7, 69, 561, 13.3, 560, 455/524, 525, 101
See application file for complete search history.

(56) References Cited

U.S. PATENT DOCUMENTS

| | | | | |
|---|---|---|---|---|
| 5,245,347 A * | 9/1993 | Bonta et al. | ................. | 342/149 |
| 5,661,489 A * | 8/1997 | Baker | ......................... | 342/373 |
| 5,890,067 A * | 3/1999 | Chang et al. | ............... | 455/446 |
| 6,006,069 A * | 12/1999 | Langston | ..................... | 455/62 |
| 6,456,610 B1 * | 9/2002 | Briley | ......................... | 370/337 |
| 6,493,545 B1 * | 12/2002 | Sugaya | ........................ | 455/272 |
| 6,690,917 B2 * | 2/2004 | Soliman et al. | ............ | 455/12.1 |
| 6,735,452 B1 * | 5/2004 | Foster et al. | ............. | 455/562.1 |
| 6,771,988 B2 * | 8/2004 | Matsuoka et al. | ........ | 455/562.1 |
| 6,900,775 B2 * | 5/2005 | Shapira | ...................... | 343/844 |
| 2003/0153361 A1 * | 8/2003 | Mori et al. | ................. | 455/562 |
| 2004/0005864 A1 * | 1/2004 | Eray | ......................... | 455/41.2 |

\* cited by examiner

*Primary Examiner*—Tilahun Gesesse
(74) *Attorney, Agent, or Firm*—Blakely Sokoloff Taylor & Zafman LLP

(57) ABSTRACT

An antenna system which is capable of having omnidirectional transmitting and receiving capabilities is disclosed. The antenna system includes a plurality of directional antennas coupled to a transceiver, wherein the antennas are configured to have their main lobes extend in different directions. In a specific embodiment, there are six directional antennas configured to have their main lobes extend substantially along the positive and negative x-axes, the positive and negative y-axes, and the positive and negative z-axes of a three-dimensional Cartesian system. The six directional antennas may also be configured to transmit and receive signals to and from overlapping free space regions to give it omnidirectional coverage. Also disclosed are a network device which employs such antenna system, a wireless network system which employs a plurality of network devices each having such antenna system, and a method and software module to transmit and receive data using such antenna system.

22 Claims, 5 Drawing Sheets

NETWORK DEVICES

| | 302 | 304 | 306 | 308 | 310 |
|---|---|---|---|---|---|
| 302 | | -X / +X | -X / +X | +Y / -Y | -X / +X |
| 304 | +X / -X | | -X / +X | (+X,+Y) / (-X,-Y) | (-X,+Y) / (+X,-Y) |
| 306 | +X / -X | +X / -X | | +X / -X | -Y / +Y |
| 308 | -Y / +Y | (-X,-Y) / (+X,+Y) | -X / +X | | -X / +X |
| 310 | +X / -X | (+X,-Y) / (-X,+Y) | -Y / +Y | +X / -X | |

FIG. 4

HIGH GAIN OMNIDIRECTIONAL ANTENNA AND RELATED METHOD

FIELD OF THE INVENTION

This invention relates generally to wireless computer networks, and in particular, to a high gain omnidirectional antenna and related method comprising a plurality of directional antennas each configured to transmit and/or receive signals to and from distinct free space regions.

BACKGROUND OF THE INVENTION

Wireless networks are becoming very popular due to the lack of hard wiring that is necessary to connect computers together. In home and office applications, wired networks typically require extensive wiring within walls, above ceilings, and in other locations not easily accessible. Thus, the labor required to install a wired network in a home or office is typically complex, time-consuming, and very expensive. The use of a wireless network eliminates the need for such labor.

In a wireless network, computers communicate with each other with the use of radio frequency (RF) signals propagating by way of a free space medium. More specifically, each computer in a wireless network includes an antenna and a transceiver to transmit and receive RF signals to and from other computers. Typically, however, the antennas used by computers of wireless networks are generally directional. That is, a directional antenna can transmit and receive signals more efficiently to and from a particular free space region than other different free space regions.

It is desirable that the transmit and receive efficiencies of signals transmitted between computers in a wireless network be optimal. This is because there are other extraneous signals propagating within the signal environment of the wireless network. These extraneous signals may interfere with the desired signals of the wireless network, which may adversely affect the data communication of the wireless network. Moreover, higher power transmission requirements may be necessary to overcome transmit and receive inefficiencies in a wireless network, leading to more expensive and complicated hardware to meet such higher power transmission requirements.

Since the antennas used in a wireless network are typically directional, it may not be possible to position the respective antennas of each computer in a wireless network such that each antenna lies within the respective optimal transmit and receive zones of every other antenna in the wireless network.

SUMMARY OF THE INVENTION

Accordingly, an aspect of the invention relates to an antenna system which is capable of having omnidirectional transmitting and receiving capabilities. The antenna system comprises a plurality of directional antennas coupled to a common transceiver, wherein the directional antennas are configured to have their main lobes extend in different directions. In a specific embodiment, there are six directional antennas configured to have their respective main lobes extend substantially along a positive x-axis, a negative x-axis, a positive y-axis, a negative y-axis, a positive z-axis, and a negative z-axis of a three-dimensional Cartesian system. The six directional antennas may also be configured to transmit and receive signals to and from overlapping free space regions so as to give the antenna system an omnidirectional coverage.

Other aspects relate to a network device which employs such antenna system, a wireless network system which employs a plurality of network devices each having such antenna system, and a method and software module to transmit and receive data using such antenna system.

Other aspects, features and techniques of the invention will become apparent to one skilled in the relevant art in view of the following detailed description of the invention.

BRIEF DESCRIPTION OF THE DRAWINGS

FIG. 4 illustrates a table showing an exemplary assignment of directional antennas for optimal communications between network devices in a wireless network system;

DETAILED DESCRIPTION OF THE INVENTION

Figure 1A:
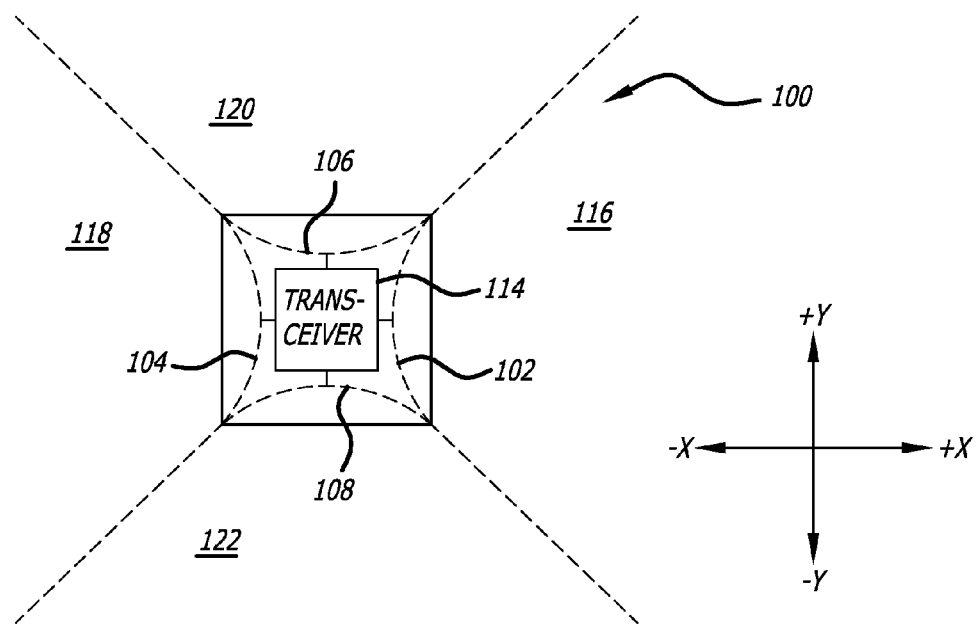
FIGS. 1A-B illustrate top and side views of an exemplary antenna system in accordance with an embodiment of the invention.
Figure 1B:
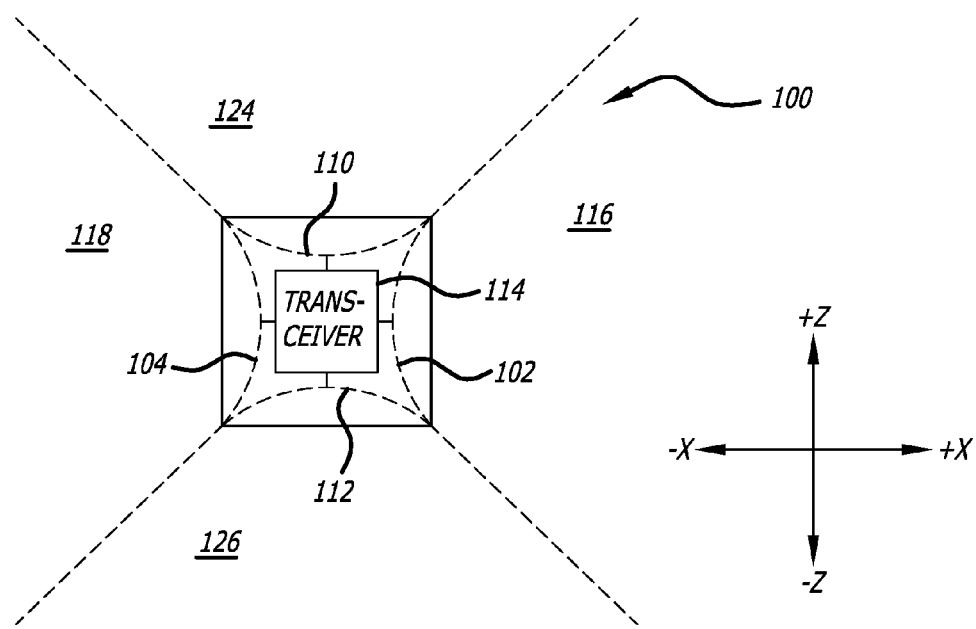

FIGS. 1A-B illustrate top and side views of an exemplary antenna system 100 in accordance with an embodiment of the invention. The antenna system 100 comprises a plurality of directional antennas 102, 104, 106, 108, 110, and 112 configured to transmit and receive signals to and from distinct free space regions 116, 118, 120, 122, 124 and 126. The antenna system 100 further comprises a transceiver 114 coupled to the directional antennas 102, 104, 106, 108, 110, and 112 to process signals received therefrom and signals to be sent thereto.

In the exemplary configuration shown in FIGS. 1A-B, the directional antennas 102, 104, 106, 108, 110, and 112 are arranged such that their primary lobe extend respectively along the positive and negative axes of a three-dimensional Cartesian system. For instance, the primary lobe of directional antenna 102 extends substantially along the x-axis in the positive direction, the primary lobe of directional antenna 104 extends substantially along the x-axis in the negative direction, the primary lobe of directional antenna 106 extends substantially along the y-axis in the positive direction, the primary lobe of directional antenna 108 extends substantially along the y-axis in the negative direction, the primary lobe of directional antenna 110 extends substantially along the z-axis in the positive direction, and the primary lobe of directional antenna 112 extends substantially along the z-axis in the negative direction.

The distinct free space regions 116, 118, 120, 122, 124 and 126 in which the directional antennas 102, 104, 106, 108, 110, and 112 are designed to transmit and receive signals to and from, may overlap with each other to provide essentially an overall omnidirectional coverage. In other words, each free space region may overlap with all of its adjacent free space regions. For instance, free space region 116 may overlap with free space regions 120, 122, 124, and 126. Similarly, free space region 118 may overlap with free space regions 120, 122, 124, and 126. Accordingly, the antenna system 100 can be made omnidirectional by having a plurality of directional antennas configured to have their main lobes point respectively and substantially to the six orthogonal directions of a three-dimensional Cartesian system, and to cover overlapping free space regions.

Figure 2A:
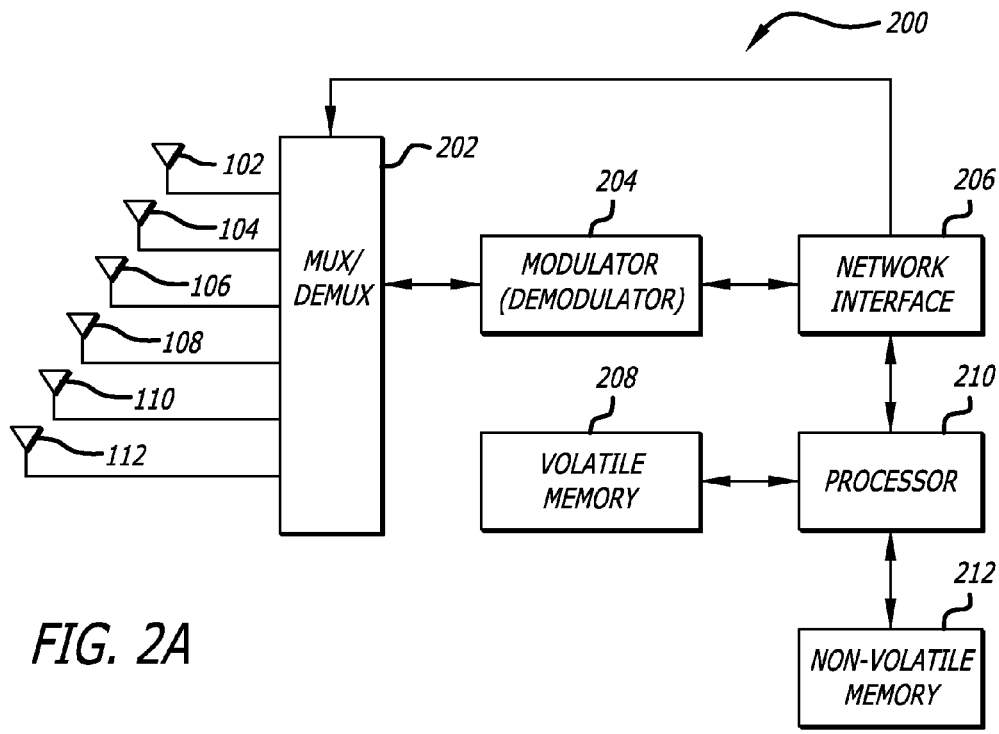
FIG. 2A illustrates a block diagram of an exemplary transceiver in accordance with an embodiment of the invention.

FIG. 2A illustrates a block diagram of an exemplary transceiver 200 in accordance with an embodiment of the invention. The transceiver 200 is a specific example of transceiver 114 shown in FIGS. 1A-B. The transceiver 200 comprises a multiplexer/demultiplexer 202, a modulator/demodulator 204, a network interface 206, a processor 210, a volatile memory 208, and a non-volatile memory 212. The multiplexer/demultiplexer 202 is coupled to the plurality of directional antennas 102, 104, 106, 108, 110, and 112. The transceiver 200 can transmit and receive data to and from one or more other network devices of a wireless network system. The discussion of the operation of the transceiver 200 follows.

In transmit mode, the processor 210, under the control of one or more software modules permanently stored in the non-volatile memory 212 and/or temporarily stored in the volatile memory 208, generates data to be transmitted to another network device in the wireless network system. The processor 210 sends the data and destination information to the network interface 206 for proper data packaging and transmission per any number of transmission protocols. Once the data is properly packaged, the network interface 206 sends the packaged data to the modulator 204 which subsequently modulates the data onto an appropriate carrier for wireless transmission to the destination network device. The network interface 206, using the destination information of the data, determines which of the one or more antennas 102, 104, 106, 108, 110, and 112 to use to optimally transmit the data to the destination device. Accordingly, the network interface 206 instructs the demultiplexer 202 to only selectively couple a subset of the antennas 102, 104, 106, 108, 110, and 112 to the modulator 204 to be used for the transmission of the data.

In receive mode, the network interface 206 initially instructs the multiplexer 202 to couple all of the antennas 102, 104, 106, 108, 110, and 112 to the demodulator 204. The transceiver 200 receives data modulated onto a carrier by way of one or more of the antennas 102, 104, 106, 108, 110, and 112. The multiplexer 202 routes the data to the demodulator 204 to remove the data from the carrier. The demodulated data is then sent to the network interface 206 for depacketizing and assembling of the data. The assembled data then is sent to the processor 210 which process the data under the control of one or more software modules permanently stored in the non-volatile memory 212 and/or temporarily stored in the volatile memory 208. As an option, in a data receiving session from a particular network device, the network interface 206 may instruct the multiplexer 202 to de-couple the non-used antennas from the demodulator 204 so as to eliminate or reduce electromagnetic interference.

As an alternative embodiment, the transceiver 200 may also be configured to set up multiple independent channels to the same or other respective network devices. For example, in transmit mode, the network interface 206 may receive data from the processor 210 intended for a plurality of network devices. Once the network interface 206 receives such data with the destination information, the network interface 206 packetizes the data according to a desired protocol, and then sends it to the modulator 204 to place the packetized data onto a carrier for wireless transmission. The network interface 206 also instructs the demultiplexer 202 to couple a unique subset of the antennas 102, 104, 106, 108, 110 and 112 to the modulator 204 such that simultaneous transmission channels are setup between the transceiver 200 and two or more network devices.

Yet as another alternative embodiment, the transceiver 200 may be configured in receive mode to coherently add the signals received from a plurality of the antennas 102, 104, 106, 108, 110 and 112. If more than one of the antennas 102, 104, 106, 108, 110 and 112 receive a signal carrying data from a particular network device, the multiplexer 202 may be configured to coherently add the signals received from more than one antenna. This has the advantage of increasing the signal-to-noise (SNR) ratio of the total received signal, thereby improving signal coverage, data rates, and reliability.

Figure 2B:
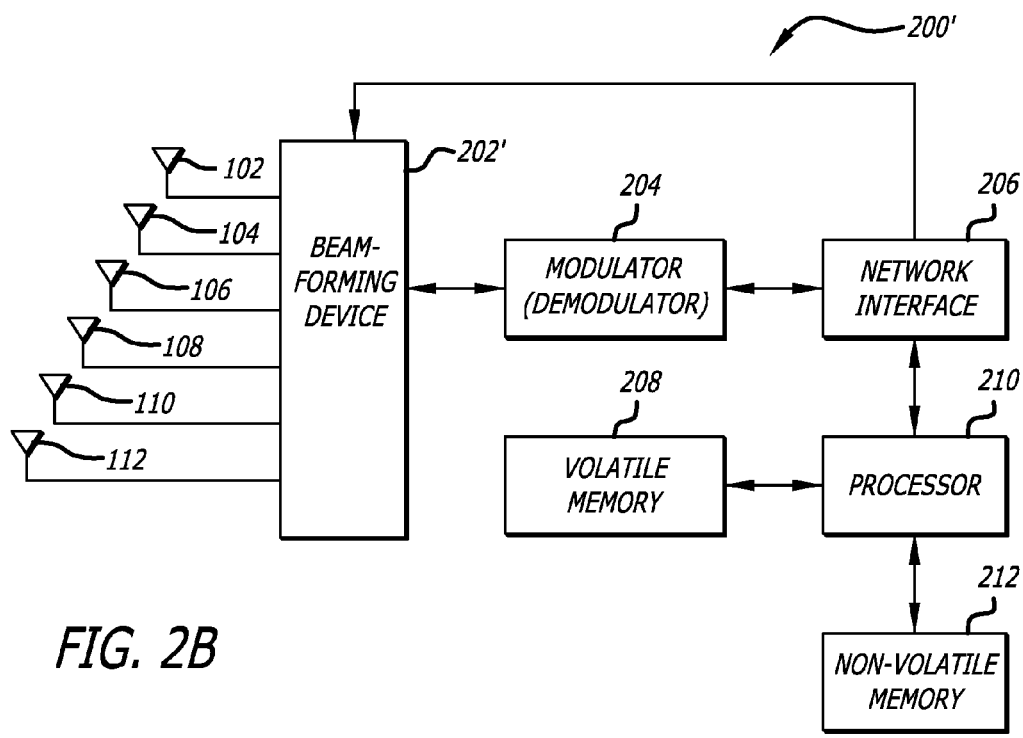
FIG. 2B illustrates a block diagram of another exemplary transceiver in accordance with an embodiment of the invention.

FIG. 2B illustrates a block diagram of another exemplary transceiver 200' in accordance with an embodiment of the invention. The exemplary transceiver 200' is a modified version of the previously discussed transceiver 200. In transceiver 200', the multiplexer/demultiplexer has been replaced with an antenna beam forming device 202'. The beam forming device 202' can configure a plurality of the antennas such that their combined radiation pattern forms a primary lobe extending in any desired direction within the three-dimensional Cartesian system. In addition, secondary lobes may extend in other directions. In receive mode, the beam forming device 202' may configure the set of antennas to form a primary lobe extending substantially along a direction towards the transmitting network device, with secondary lobes extending in the direction of any multipath components, thereby substantially maximizing the transmission efficiency between the transmitting and receiving network devices. In transmit mode, the beam forming device 202' may configure the set of antennas to form a primary lobe extending substantially along a direction towards the receiving network device, thereby substantially maximizing the transmission efficiency between the transmitting and receiving network devices.

Figure 3:
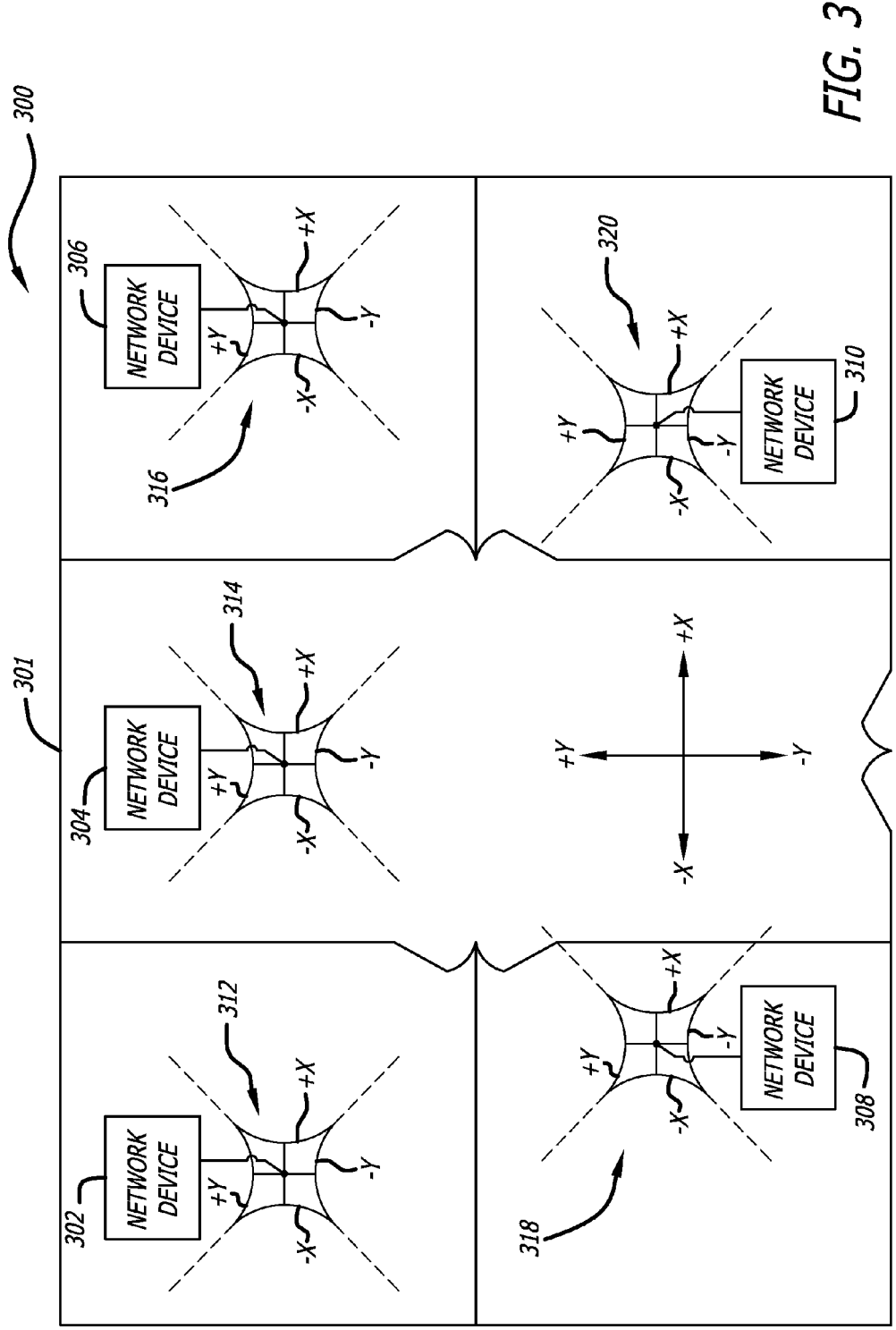
FIG. 3 illustrates a block diagram of an exemplary wireless network system in accordance with another embodiment of the invention.

FIG. 3 illustrates a block diagram of an exemplary wireless network system 300 in accordance with another embodiment of the invention. The wireless network system 300 comprises a plurality of network devices 302, 304, 306, 308, and 310 located in various locations within an exemplary location 301 (e.g. an office, a home, across various floors, buildings, etc.). The network devices 302, 304, 306, 308, and 310 are respectively coupled to antennas systems 312, 314, 316, 318, and 320. Each of the antenna systems 312, 314, 316, 318, and 320 include a plurality of directional antennas with their respective main lobes extending in various directions. In this example, each of the antenna systems 312, 314, 316, 318, and 320 have four directional antennas having their main lobes extend substantially in the +x, −y, −x, +y directions, as designated in FIG. 3. Each network device selects one or more of the directional antennas to optimize the data communication with another network device in the wireless network system 300, as will be explained with reference to the table shown in FIG. 4.

FIG. 4 illustrates a table showing an exemplary assignment of directional antennas for optimal communications between network devices in the wireless network system 300. The columns identify the transmitting network devices and the rows identify the receiving network devices. In each cell, the upper-right region indicates the one or more directional antennas used by the transmitting network device as identified in the corresponding column heading. Also, in each cell, the lower-left region indicates the one or more directional antennas used by the receiving network device as identified in the corresponding row heading.

Thus, if network device 302 is transmitting data to network device 304, it will use only the directional antenna of its antenna system 312 whose main lobes extend substantially in the positive (+) x direction. In this example, network device 304 may choose to de-couple all directional antennas from its receiving system except the −x directional antenna so as to eliminate or reduce interference signals picked up by the remaining directional antennas. As another example, if network device 304 is transmitting data to network device 308, it will use only the directional antennas of its antenna system 314 whose main lobes extend substantially in the −x and −y directions. In this example, network device 308 may choose to de-couple all directional antennas from its receiving system except its +x and +y directional antennas so as to eliminate or reduce interference signals picked up by the remaining directional antennas. This second example illustrates that more than one directional antenna can be chosen to optimize the communication between two network devices. Alternatively, if the network device 304 includes a beam forming device, it may configure the antennas such that their radiation pattern combine to form a desired radiation pattern to optimize the communication.

Figure 5:
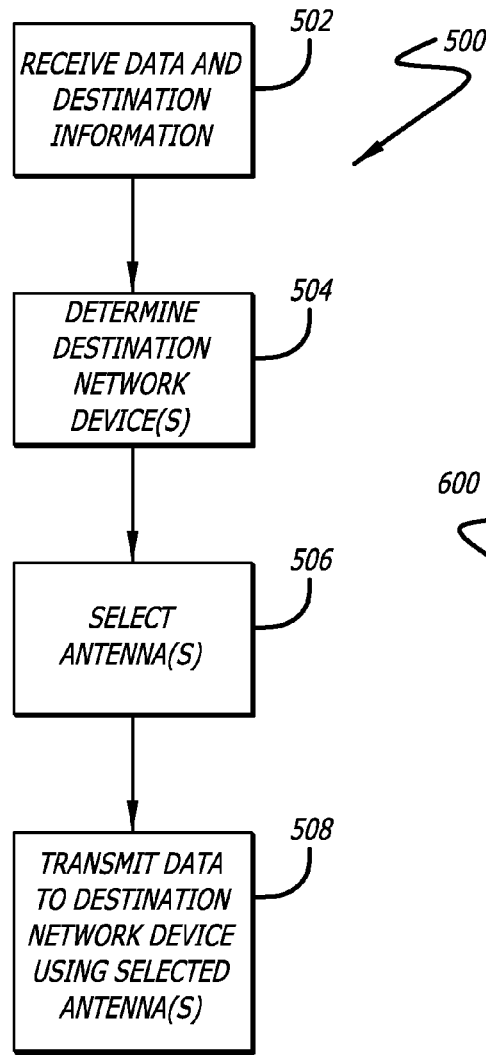
FIG. 5 illustrates a flow diagram of an exemplary data transmission method in accordance with another embodiment of the invention.

FIG. 5 illustrates a flow diagram of an exemplary data transmission method 500 in accordance with another embodiment of the invention. Such data transmission method 500 may be employed by any of the network devices in a wireless network system. According to the method 500, the network device receives or generates data having destination information (block 502). Based on the destination information, the network device determines the one or more network devices in the wireless network system to which the data is to be sent (block 504). Then, the network device selects the one or more directional antennas of its attached antenna system to use for optimally transmitting the data to the intended one or more network devices (block 506). This can encompass selection of the desired antennas with fixed primary lobes and/or beam forming to form a desired resultant primary lobe. Then, the network device transmits the data to the intended one or more network devices using the selected one or more directional antennas (block 508).

Figure 6:
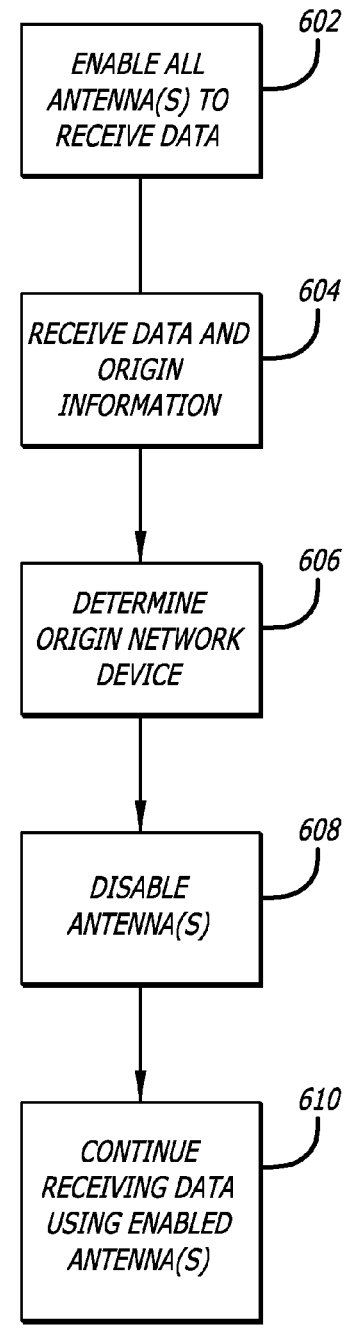
FIG. 6 illustrates a flow diagram of an exemplary data receiving method in accordance with another embodiment of the invention.

FIG. 6 illustrates a flow diagram of an exemplary data receiving method 600 in accordance with another embodiment of the invention. Such data receiving method 600 may be employed by any of the network devices in a wireless network system. According to the method 600, the network device enables all the directional antennas of its attached antenna system to receive incoming data (block 602). Then, the network device receives the incoming data including its origination information (block 604). Based on the origination information, the network device determines the network device in the wireless network system from which the data is being sent (block 606). Then, the network device disables the one or more directional antennas of its attached antenna system which are not being used to optimally receive the incoming data (block 608). Alternatively, if the network device includes a beam forming device, the network device may set up a desired radiation pattern to optimize the receipt of the data. Then, the network device continues to receiving the incoming data to using only the enabled one or more directional antennas (block 610).

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A network device, comprising:
 a plurality of directional antennas configured to have their respective main lobes extend in different directions;
 a modulator/demodulator;
 a multiplexer/demultiplexer to selectively couple one or more of said directional antennas to said modulator/demodulator;
 a processor; and
 a network interface to receive data from said processor, the data including destination information that is used to determine a relative location of a destination network device from said network device, and to control said multiplexer/demultiplexer to selectively couple a desired subset of said directional antennas to said modulator/demodulator based on said destination information and decouple a remainder of said directional antennas other than said desired subset of said directional antennas.

2. The network device of claim 1, wherein said plurality of directional antennas are configured such that their main lobes are substantially orthogonal to each other.

3. The network device of claim 2, wherein said plurality of directional antennas comprises six directional antennas having their respective main lobes extend substantially along a positive x-axis, a negative x-axis, a positive y-axis, a negative y-axis, a positive z-axis, and a negative z-axis of a three-dimensional Cartesian system.

4. The network device of claim 1, wherein said plurality of directional antennas are configured such that their main lobes extend substantially along an x-axis, a y-axis, and a z-axis of a three-dimensional Cartesian system, respectively.

5. The network device of claim 1, wherein said plurality of directional antennas are configured to transmit and/or receive signals to and from overlapping free space regions.

6. The network device of claim 1, wherein said multiplexer/demultiplexer is interposed between said plurality of directional antennas and said modulator/demodulater.

7. The network device claim 1, wherein said network device receives data from said modulator/demodulator with information regarding an originating destination network device of said data, and wherein said network device instructs said multiplexer/demultiplexer to selectively couple a subset of said directional antennas to said modulator/demodulator based on said information regarding said originating network device.

8. The network device of claim 1, wherein said multiplexer/demultiplexer coherently combines signals from two or more of said directional antennas.

9. An antenna system comprising:
 a transceiver; and
 a plurality of directional antennas coupled to said transceiver, said plurality of directional antennas are configured to have their respective main lobes extend in different directions substantially along an x-axis, a y-axis, and a z-axis of a three-dimensional Cartesian system,
 wherein the transceiver to determine a location of a destination network device for data to be transmitted in order to determine a first subset of said plurality of directional antennas to transmit said data while a second subset of said plurality of directional antennas that differs from the first subset of said plurality of directional antennas and includes at least two of said plurality of directional antennas is not used for transmission.

10. The antenna system of claim 9, wherein said plurality of directional antennas are configured such that their main lobes are substantially orthogonal to each other.

11. The antenna system of claim 10, wherein said plurality of directional antennas comprises six directional antennas extending substantially along a positive x-axis, a negative x-axis, a positive taxis, a negative y-axis, a positive z-axis, and a negative z-axis of the three-dimensional Cartesian system.

12. The antenna system of claim 10, wherein said plurality of directional antennas are configured to transmit and/or receive signals to and from overlapping free space regions.

13. A wireless network system including a plurality of network devices each. comprising:
 a plurality of directional antennas configured to have their respective main lobes extend in different directions;
 a modulator/demodulator;
 a multiplexer/demultiplexer to selectively couple one or more of said directional antennas to said modulator/demodulator; and
 a network interface to receive data from said modulator/demodulator along with destination information that is used to determine a relative location of a first network device of said plurality of network devices from a second network device of said plurality or network devices and to control said multiplexer/demultiplexer to selectively couple a desired set of said directional antennas to said modulator/demodulator based on said destination information.

14. The wireless network system of claim 13, wherein said plurality of directional antennas are configured such that their main lobes are substantially orthogonal to each other.

15. The wireless network system of claim 13, wherein said plurality of directional antennas are configured such that their main lobes extend substantially along an x-axis, a y-axis, and a z-axis of a three-dimensional Cartesian system, respectively.

16. The wireless network system of claim 13, wherein said plurality of directional antennas comprises six directional antennas extending substantially along a positive x-axis, a negative x-axis, a positive y-axis, a negative y-axis, a positive z-axis, and a negative z-axis of a three-dimensional Cartesian system, respectively.

17. The wireless network system of claim 13, wherein said plurality of directional antennas are configured to transmit and/or receive signals to and from overlapping free space regions.

18. The wireless network system of claim 13, further comprising a processor to process data.

19. A method comprising:
 receiving and/or generating data including destination information;
 determining a relative location of a network device to which said data is to be sent based on said destination information;
 transmitting said data to said network device using only a first subset of available directional antennas covering the relative location of the network device; and
 disabling a second subset of the available directional antennas that is mutually exclusive from said first subset of available directional antennas.

20. A computer readable medium comprising one or more software modules executed by a processor to:
 receive and/or generate data with destination information;
 determine a relative direction to a network device to which said data is to be sent based on said destination information;
 transmit said data to said network device using only a first subset of available directional antennas solely covering the relative location of the network device; and
 disable a second subset of the available directional antennas that is mutually exclusive from said first subset of available directional antennas.

21. A method comprising:
 enabling a set of directional antennas to receive data;
 receiving said data including origination information;
 determining a relative location of a network device from which said data was sent based on said origination information;
 disabling a subset of said set of directional antennas that support locations different from said relative location of said network device; and
 receiving subsequent data with said origination information by way of the remaining enabled directional antennas that support the relative location of said network device.

22. A computer readable medium comprising one or more software modules to:
 enable a set of directional antennas to receive data;
 receive said data including origination information;
 determine a relative location of a network device from which said data was sent based on said origination information;
 disable a subset of said set of directional antennas based on said relative location of said network device; and
 receive subsequent data with said origination information by way of the remaining enabled directional antennas that solely support an area including the relative location of said network device.

* * * * *